United States Patent
Sakuragi et al.

(10) Patent No.: US 6,219,199 B1
(45) Date of Patent: Apr. 17, 2001

(54) SPINDLE DEVICE HAVING A DYNAMIC-PRESSURE-FLUID BEARING

(75) Inventors: Katsunori Sakuragi; Yasuo Saeki, both of Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/151,734

(22) Filed: Sep. 11, 1998

(30) Foreign Application Priority Data

Sep. 12, 1997 (JP) .................................................. 9-248037

(51) Int. Cl.[7] .................................................. G11B 17/02
(52) U.S. Cl. .......................................................... 360/99.08
(58) Field of Search .............................. 360/98.07, 99.04, 360/99.08; 310/90; 384/107, 112, 121, 123, 124, 132, 100

(56) References Cited

U.S. PATENT DOCUMENTS 5,770,906 * 6/1998 Hazelton et al. ...................... 310/90

FOREIGN PATENT DOCUMENTS

| | | |
|---|---|---|
| 6-178489 | 6/1994 | (JP) . |
| 6-245427 | 9/1994 | (JP) . |
| 6-311695 | 11/1994 | (JP) . |
| 6-311696 | 11/1994 | (JP) . |
| 7-264796 | 10/1995 | (JP) . |
| 6-319240 | 11/1995 | (JP) . |
| 7-336924 | 12/1995 | (JP) . |
| 8-161822 | 6/1996 | (JP) . |
| 8-163819 | 6/1996 | (JP) . |
| 8-163820 | 6/1996 | (JP) . |
| 8-163821 | 6/1996 | (JP) . |
| 8-172750 | 7/1996 | (JP) . |
| 8-210364 | 8/1996 | (JP) . |
| 8-210365 | 8/1996 | (JP) . |
| 8-214497 | 8/1996 | (JP) . |
| 8-232965 | 9/1996 | (JP) . |
| 8-232966 | 9/1996 | (JP) . |
| 8-237906 | 9/1996 | (JP) . |
| 8-254210 | 10/1996 | (JP) . |
| 8-270653 | 10/1996 | (JP) . |

* cited by examiner

Primary Examiner—Robert S. Tupper
(74) Attorney, Agent, or Firm—Wenderoth, Lind & Ponack, L.L.P.

(57) ABSTRACT

In a spindle device mounted to a disc driving apparatus, a mist seal which blocks a mist of lubricating fluid, an oil seal which prevents the lubricating fluid from flowing out, and an oil pool which prevents surplus fluid from flowing out, are combined and disposed so that the lubricating fluid from a dynamic-pressure-fluid bearing is prevented from flowing out or splashing into a clean space. As a result, inconveniences such as a head crush or a head absorption can be avoided, and a reliable spindle device is realized.

22 Claims, 8 Drawing Sheets

SPINDLE DEVICE HAVING A DYNAMIC-PRESSURE-FLUID BEARING

FIELD OF THE INVENTION

The present invention relates to a spindle device to be mounted to a disc driving apparatus for driving, e.g., discs, and more particularly to a structure of a spindle motor of an outer rotor type, which is formed by fixing rotor magnets within a hub that clamps magnetic discs.

BACKGROUND OF THE INVENTION

One of the distinctive trends in computer systems is that memory capacities are becoming larger and larger due to the extending of computer networks, popularity of engineering work stations, utilization of data bases and the like. Further, the most common magnetic disc driving apparatus built in computer systems as a memory apparatus has been changed from the 5.25-inch disc drive to the 3.5-inch disc drive, which proves the demand for memory apparatus to be made more compact and slim in size. The demands of magnetic disc driving apparatus, such as the demands for larger capacity, smaller and slimmer size, naturally lead to demands for a spindle motor (hereinafter called simply a "motor") mounted to the disc driving apparatus to be of higher accuracy and smaller size. The higher accuracy, among others, is strongly demanded.

Along with the technology advancement, a memory capacity of the magnetic disc has increased, and the track density of discs can be 8000 TPI (tracks per inch)—10000 TPI, which is converted to a track pitch as fine as 3 $\mu$m. The performance required of the motor mounted to the apparatus is to always accurately trace each track having such fine track pitch. This kind of motor has employed ball bearings in general; however, the rotation of ball bearings inevitably generates vibration. The level of vibration is measured to be as fine as ca. 0.15 $\mu$m based on NRRO (Non Repeatable Run Out), which is non repeatable sway of the hub of the motor. This vibration level is the minimum possible value for the ball bearings. When this vibration occurs, a magnetic head deviates from a track by the displacement component due to the vibration. This deviation has a harmful influence on read/write operation, and the conventional apparatus employing the ball bearings thus allows almost no margin to meet the required performance.

Recently, a motor has been proposed in order to improve the accuracy, lower the noise level, and extend the product life. The motor comprises a fixed shaft, a sleeve that is supported and rotated by the shaft and a radial-dynamic-pressure-fluid bearing, or the motor comprises a fixed sleeve, a rotating shaft that is supported and rotated by the sleeve and the radial-dynamic-pressure-fluid bearing.

The motor employing the dynamic-pressure-fluid bearing is disclosed in Japanese Patent Application unexamined publication No. H06-178489.

Figure 16:
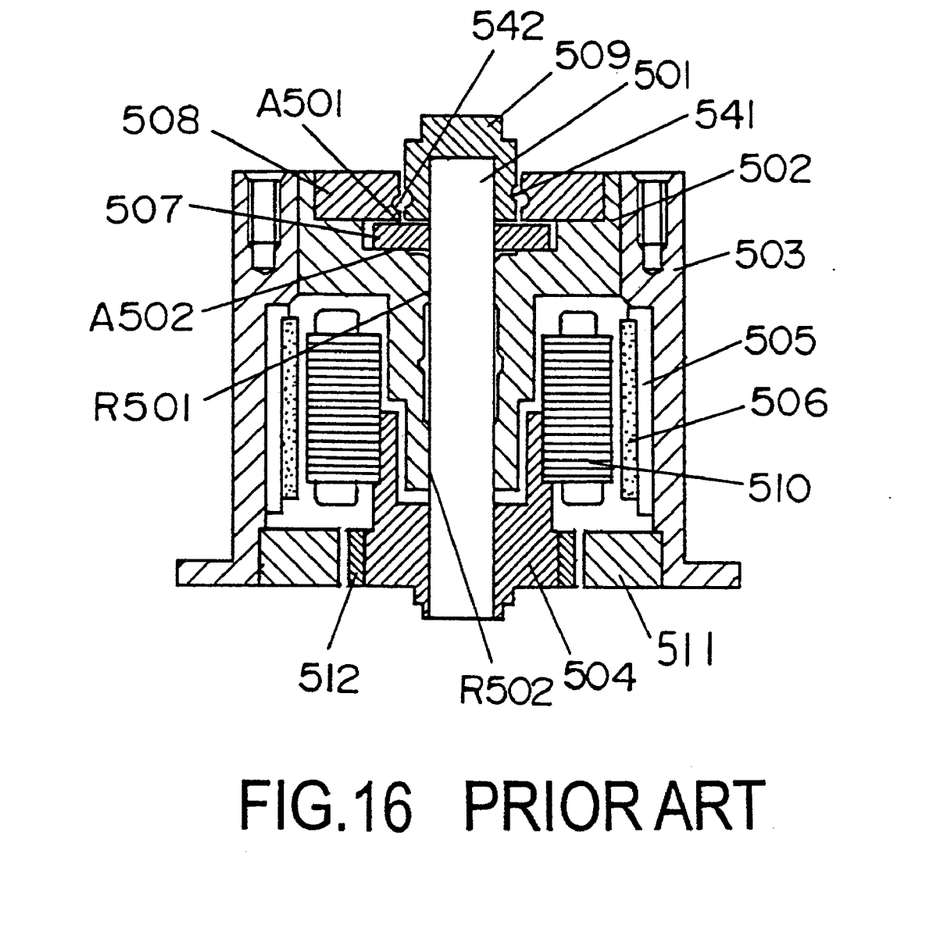
FIG. 16 is a cross section of a conventional motor.

FIG. 16 is a cross sectional view of this conventional motor. In FIG. 16, a shaft 501 is vertically fixed at the center of a bracket 504, and a stator core 510 with wires wound thereon is mounted to the bracket 504. A rotor magnet 506 is fixed to a rotor frame 505 so that the rotor magnet faces the stator core 510. The rotor frame 505 is mounted to the hub 503. A bushing 511 is fixed at a lower section of an inner rim of the hub 503, and another bushing 512 is mounted to an outer rim of the bracket 504. The bushing 511 faces the bushing 512 with a clearance in-between. The magnetic discs (not shown) are to be mounted around the hub 503.

Grooves (not shown) are provided inside of a sleeve 502, the grooves produce dynamic pressure of lubricating fluid by the rotation of the sleeve 502, which is rotatively supported by the fixed shaft 501 via lubricating fluid. Radial-dynamic-pressure-fluid bearings R501 and R502 are thus constructed. Axial dynamic pressure bearings A501 and A502 comprise both end faces of a fixed thrust ring 507, a lower face of rotation thrust ring 508 and an upper face of the sleeve 502. A groove 541 is provided on an outer circumference of a cap 509, and another groove 542 is provided on an inner circumference of the rotation thrust ring 508. The lower rim of groove 541 is disposed at substantially the center of groove 542, and the upper rim of groove 542 is disposed at substantially the center of groove 541. The upper and lower rims of each groove 541 and 542 face each other with some offset.

The conventional motor employing the above dynamic-pressure-fluid bearing has a possible problem that the lubricating fluid might splash into a space where the magnetic discs are disposed. In this space, a magnetic head reads/writes data from/to the magnetic disc with little clearance between the head and disc. The space thus must be kept utmost clean because if the lubricating fluid splashes or flows into the space, serious problems such as a head crush, a head absorption, etc. will occur. (Hereinafter the above space is called the "clean space".)

The above conventional motor has provided a countermeasure against lubricating oil splashes by forming an oil pool using the grooves 541 and 542 to prevent the lubricating fluid from splashing out from the upper part of the motor; however, this countermeasure cannot prevent a mist of lubricating fluid from flowing out.

SUMMARY OF THE INVENTION

The present invention aims to provide a reliable spindle device which avoids inconvenience such as a head crush or a head absorption by disposing a mist seal between the thrust-dynamic-pressure-fluid bearing and the clean space where magnetic discs are disposed. The mist seal prevents a mist of lubricating fluid from flowing out into the clean space where magnetic discs are disposed.

The spindle device of the present invention comprises the following elements:

(a) a bracket comprising a fixed shaft and a stator core on which wire is wound,
(b) a hub to which discs are mounted,
(c) a rotor magnet mounted to the hub and facing the stator core,
(d) a sleeve fixed to the hub and rotatively supported by the fixed shaft via the lubricating fluid,
(e) thrust-dynamic-pressure-fluid bearings disposed on both end faces of the sleeve, and
(f) a mist seal such as a viscous seal, a labyrinth seal, a magnetic fluid seal or the like disposed between the thrust-dynamic-pressure-fluid bearing and the clean space where the discs are disposed, and the mist seal blocks the mist of lubricating fluid from flowing out.

The above structure can prevent the mist of lubricating fluid from splashing into the clean space by using the mist seal.

Further, an oil seal that prevents the lubricating fluid per se from flowing out, and an oil pool that prevents surplus lubricating fluid from flowing out are combined, whereby liquid lubricating fluid is prevented from flowing out into the clean space. This structure can further enhance a reliability of the spindle device.

The spindle device according to the present invention has an advantageous sealing structure that can prevent the lubricating fluid of the dynamic-pressure-fluid bearing from splashing out into the clean space. There are the following sealing mechanisms between the dynamic-pressure-lubricating-fluid-bearing and the clean space: oil seal (surface tension seal, centrifugal force seal) and mist seal (viscous seal, magnetic fluid seal, labyrinth seal). The dynamic-pressure-lubricating-fluid-bearing holds the lubricating fluid using the surface tension seal, and the centrifugal force seal restores the lubricating fluid, further, the mist seal prevents the mist of lubricating fluid from splashing. This sealing process effectively prevents the lubricating fluid from flowing and splashing out into the clean space. A part of this arrangement can be omitted depending on the motor construction.

The oil pool and grooves in addition to the above sealing process contribute to preventing the fluid from flowing as well as splashing out not only in a continuous operation but also in an intermittent operation, at rest at a high temperature or with a change in orientation.

The thrust-dynamic-pressure-fluid bearings are disposed on both the upper and lower sections of the radial-dynamic-pressure-fluid bearing, whereby a longer bearing span for the radial-dynamic-pressure-fluid bearing can be obtained, and the rigidity is increased. As a result, the dynamic-pressure-fluid bearing can be well-balanced.

Since the spindle device of the present invention allows no flow-out of the lubricating fluid, the bearing is always filled with the lubricating fluid, which substantially extends a life span of the magnetic disc driving apparatus.

DESCRIPTION OF THE PREFERRED EMBODIMENTS

Exemplary embodiments of the present invention are detailed hereinafter by referring to the attached drawings.
(Exemplary Embodiment 1)

Figure 1:
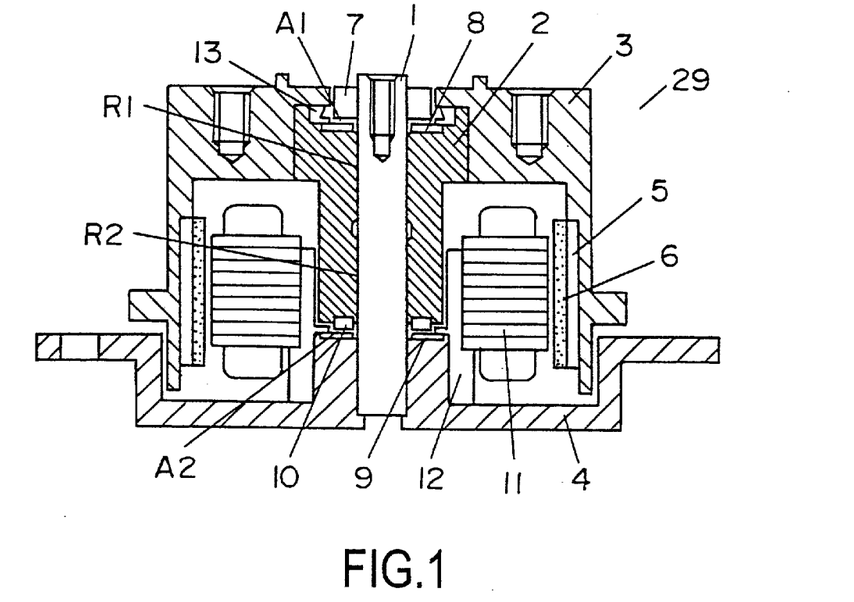
FIG. 1 is a cross section of a motor used in a first exemplary embodiment of the present invention.
Figure 2:
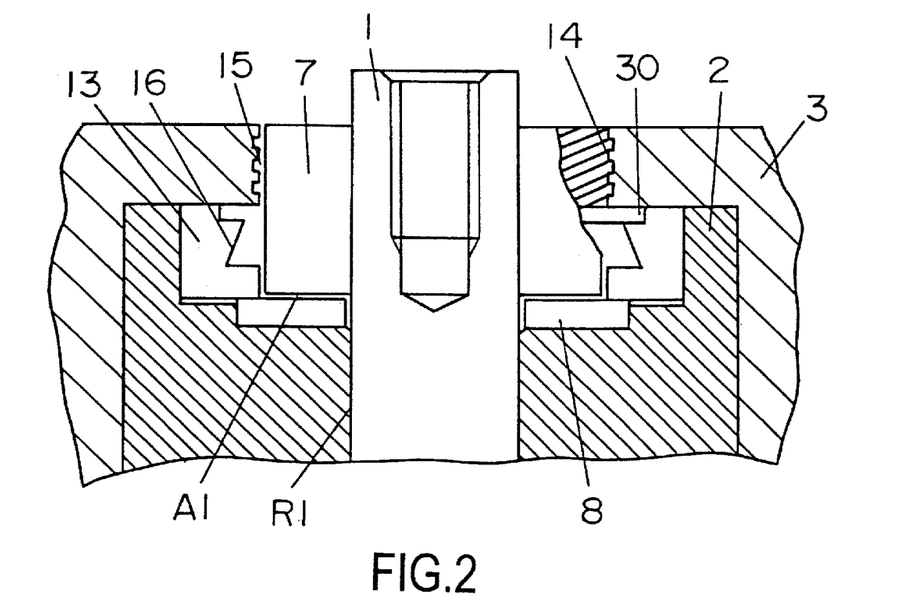
FIG. 2 is an enlarged view of an upper portion of the motor used in the first exemplary embodiment of the present invention.
Figure 3:
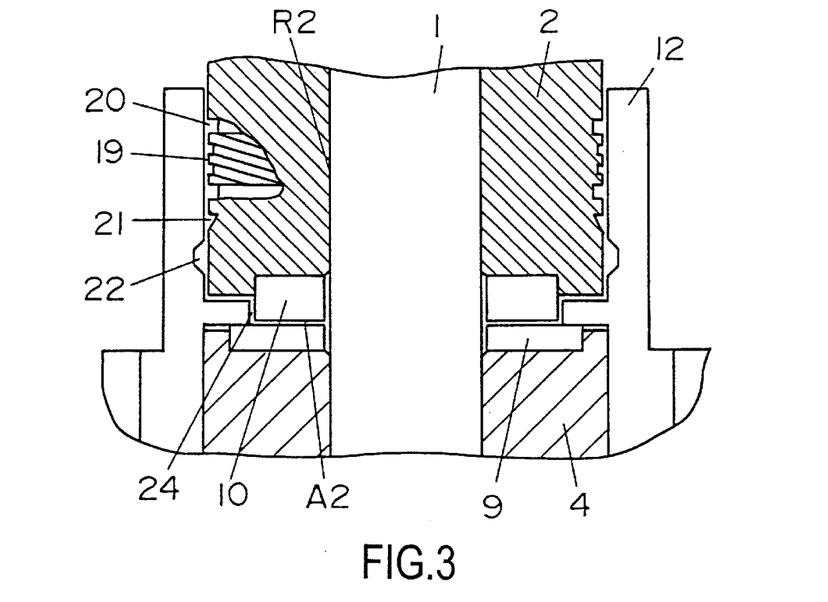
FIG. 3 is an enlarged view of a lower portion of the motor used in the first exemplary embodiment of the present invention.
Figure 4:
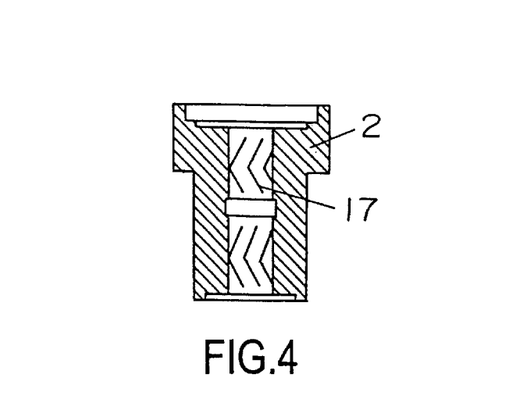
FIG. 4 details the inside of a sleeve used in the first exemplary embodiment of the present invention.
Figure 5:
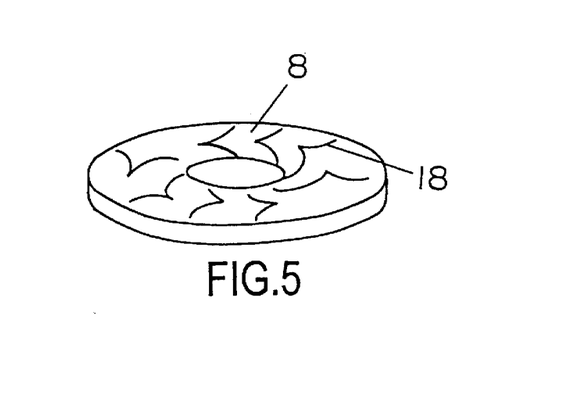
FIG. 5 details a thrust-dynamic-pressure-fluid bearing used in the first exemplary of the present invention.

FIG. 1 is a cross section of a motor used in a first exemplary embodiment of the present invention. FIG. 2 is an enlarged view of an upper portion of the motor. FIG. 3 is an enlarged view of a lower portion of the motor. FIG. 4 details the inside of sleeve used in the first exemplary embodiment. FIG. 5 details the thrust-dynamic-pressure-fluid bearing used in the first exemplary embodiment.

In FIG. 1 through FIG. 5, a shaft 1 is vertically fixed at the center of a bracket 4, for which screw holes and protruded sections are provided so that the bracket can be mounted to the disc driving apparatus. A core holder 12 is also provided in the bracket 4. A stator core 11 of coiled wires is mounted on the outer circumference of the core holder 12 so that the stator core 11 is situated opposite to a cylindrical rotor magnet 6 via a narrow clearance.

Magnetic discs (not shown) are mounted on an outer circumference of a hub 3. On the inner circumference of the hub 3, the cylindrical rotor magnet 6 is mounted via a cylindrical rotor frame 5. A sleeve 2 is mounted on another circumference of the hub 3. Grooves 17 are provided inside the sleeve 2, the grooves 17 produce dynamic pressure of lubricating fluid (not shown) through rotation of the sleeve 2. The sleeve 2 is rotatively supported by the fixed shaft 1 via lubricating fluid, and forms the radial dynamic-fluid-bearings R1 and R2.

On the upper end face of sleeve 2, a rotation thrust ring 8 is fixed, and rotatively supported via the lubricating fluid by a thrust ring 7 which is fixed on the fixed shaft 1, thereby forming a thrust-dynamic-pressure-fluid bearing A1. The rotation thrust ring 8 has grooves 18 which produce dynamic pressure in the lubricating fluid. These grooves 18 can be provided on the fixed thrust ring 7 instead of on the rotation thrust ring 8. On the lower end face of sleeve 2, a rotation thrust ring 10 is fixed, and rotatively supported via the lubricating fluid by a thrust ring 9 which is fixed to an end portion of bracket 4, thereby forming a thrust-dynamic-pressure-fluid bearing A2. The rotation thrust ring 10 has grooves (similar to the grooves 18 of one rotation thrust ring 8) which produce dynamic pressure in the lubricating fluid. These grooves can be provided on fixed thrust ring 9 instead of on the thrust ring 10.

On the upper side of the rotation thrust ring 8, a seal member 13 is fixed to the sleeve 2 so as to sandwich the ring 8 between the seal member 13 and the sleeve 2. On the seal member 13, a tapered centrifugal force seal 16 and an oil pool 30 are provided. The inner circumference of hub 3 faces the outer circumference of fixed thrust ring 7 via a small clearance 15, this small clearance preferably ranging from 0.03 to 0.05 mm. On the inner circumference of hub 3, a viscous seal 14 is formed. The viscous seal 14 employs a screw to be rotated for drawing air in from the clean space 29.

An example of the viscous seal has the following structure and mechanism. In a cylindrical space, the screw is provided on an inner or outer circumference that forms the cylindrical space. The screw rotates to produce pressure so that air flows from the clean space where the discs are disposed toward the thrust-dynamic-pressure-fluid bearing, whereby the mist of the lubricating fluid is prevented from flowing into the clean space 29.

On the lower circumference of sleeve 2, a tapered centrifugal force seal 21 is provided. An example of a mechanism of the centrifugal force seal now will be described. The centrifugal force is proportional to a radius from a rotating center, and based on this principle, when the motor is driven, the lubricating fluid flows toward the dynamic-pressure-fluid bearing by utilizing the taper. A liquid of the lubricating fluid is thus prevented from flowing out.

For a better effect, the centrifugal force seal 21 is disposed on the outer circumference of the rotative sleeve 2.

The lower outer circumference of sleeve 2 faces the inner circumference of core holder 12 via a small clearance 20, this small clearance preferably ranging from 0.03 to 0.05 mm. Another viscous seal 19 is formed on the lower outer circumference of sleeve 2. The viscous seal 19 employs a screw that rotates to draw air in from the clean space 29 through the space where the stator core 11 and rotor magnet 6 are disposed.

The above structure allows the centrifugal force seals 16 and 21 to prevent liquid lubricating fluid from flowing out, and allows the viscous seals 14 and 19 to prevent lubricating fluid mist from flowing out into the clean space.

A small annular space is provided between the outer circumference of the ring 10 and the inner circumference of core holder 12, whereby a surface tension seal 24 is formed to provide an oil seal. Further, an oil pool 22 is disposed on the core holder 12. These arrangements reinforce the prevention of the flowing out of the lubricating fluid.

The lubricating fluid is filled into the radial-dynamic-pressure-fluid bearings R1 and R2 as well as the thrust-dynamic-pressure-fluid bearings A1 and A2 when the spindle device is assembled. When the motor is rotated, the lubricating fluid concentrates on the centers of R1, R2, A1 and A2. However, surplus fluid does not have a constant flow, and sometimes splashes due to the centrifugal force. When the spindle device is assembled, bubbles are incidentally entrapped in the lubricating fluid. The bubbles grow due to temperature changes, or concentrate and grow in a lower pressure section in the bearings due to the rotation. The growth of the bubbles pushes up the fluid to cause splashing. When the spindle device is left at a high temperature atmosphere for a long period, the lubricating fluid is more likely to leak. In these cases, the spindle device of the present invention can prevent the fluid from flowing and splashing out into the clean space 29 thanks to a combination of the mist seal, oil seal and oil pool.

(Exemplary Embodiment 2)

Figure 6:
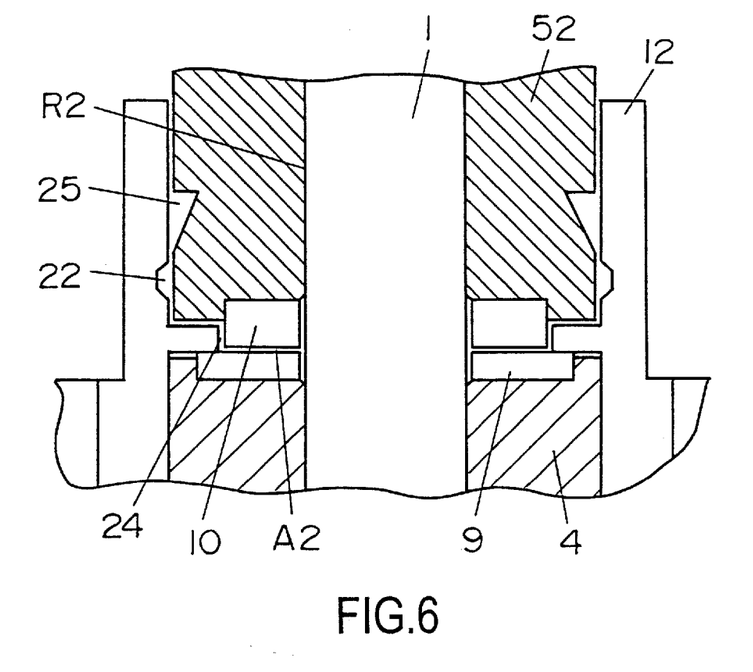
FIG. 6 is an enlarged view of a lower portion of a motor used in a second exemplary embodiment of the present invention.

FIG. 6 is an enlarged view of a lower portion of a motor used in the second exemplary embodiment of the present invention. In FIG. 6, grooves (not shown, but similar to the grooves 17 in FIG. 4) are provided inside the sleeve 52. These grooves generate dynamic pressure through rotation. The sleeve 52 is rotatively supported via the lubricating fluid by the fixed shaft 1, thereby forming the radial-dynamic-pressure-fluid bearing R2. This embodiment differs from the first exemplary embodiment only in the following point: a tapered centrifugal force seal 25 has a larger taper angle than that in the first exemplary embodiment. The tapered seal 25 is disposed as an oil seal on the lower outer circumference of the sleeve 52. In the lower part of sleeve 52, in particular, the fluid is subject to flowing out due to gravity. A larger taper angle is thus preferably employed for the centrifugal force seal 25 to expand the space. This structure further assures the prevention of fluid flow-out.

(Exemplary Embodiment 3)

Figure 7:
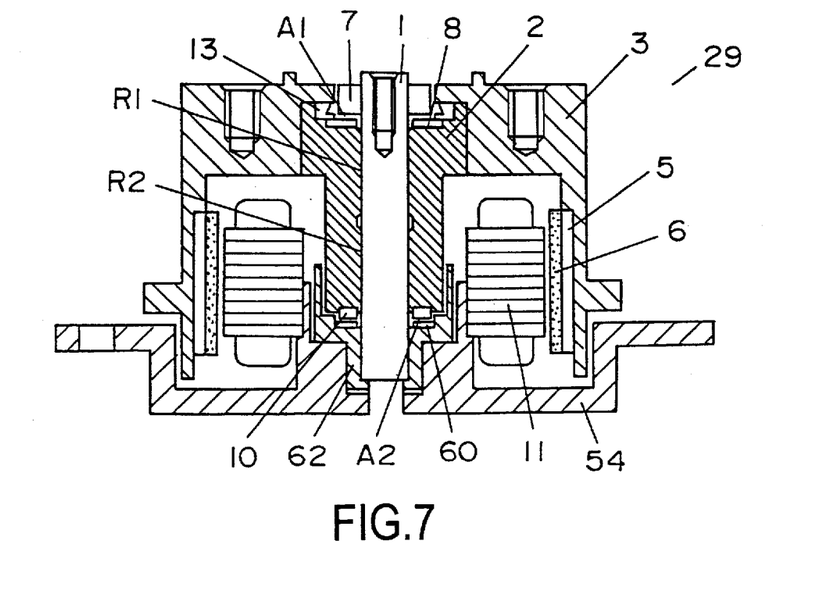
FIG. 7 is a cross section of a motor used in third exemplary embodiment of the present invention.
Figure 8:
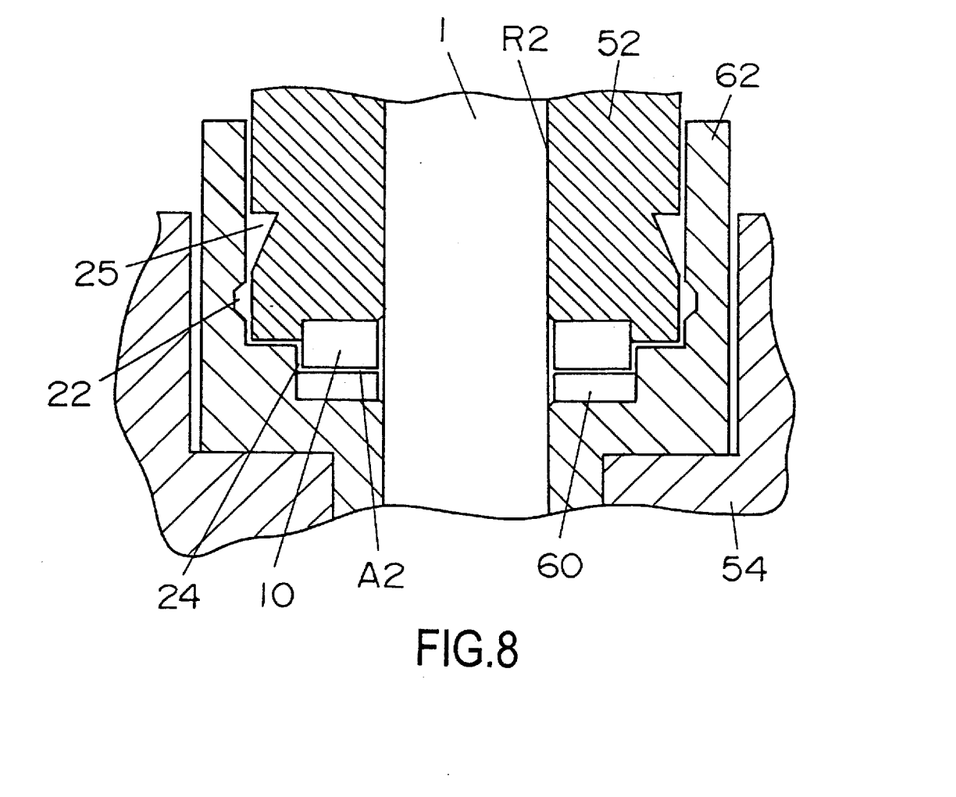
FIG. 8 is an enlarged view of a lower portion of the motor used in the third exemplary embodiment of the present invention.

FIG. 7 is a cross section of a motor used in the third exemplary embodiment of the present invention. FIG. 8 is an enlarged view of a lower portion of the motor.

In FIGS. 7 and 8, this embodiment differs from the first and second exemplary embodiments in the following points: The stator core 11 of coiled wires is mounted to a bracket 54, and a mount collar 62 is mounted at the center of an inner circumference of the bracket 54. The shaft 1 is fixed at the center of the mount collar 62, and a thrust ring 60 is fixed at the end face of the mount collar 62. Grooves for generating dynamic pressure are provided on either the thrust ring 60 or a rotating ring 10 mounted to the sleeve 52. The thrust-dynamic-pressure-fluid bearing A2 is formed by the fixed thrust ring 60 and the rotation thrust ring 10 via the lubricating fluid. This structure can also prevent the fluid from flowing out as already discussed in connection with the first and second exemplary embodiments.

(Exemplary Embodiment 4)

Figure 9:
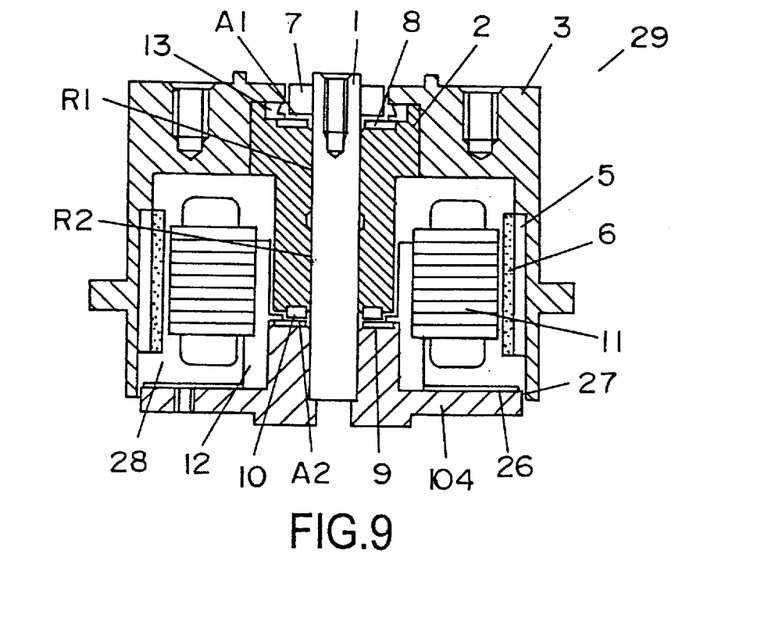
FIG. 9 is a cross section of a motor used in a fourth exemplary embodiment of the present invention.

FIG. 9 is a cross section of a motor used in the fourth exemplary embodiment of the present invention.

This embodiment differs from the first exemplary embodiment in the following points: On a bracket 104, an airtight seal 26 is disposed to seal the screw holes and the like provided on the bracket 104. A small annular space is provided between the inner circumference of hub 3 and the outer circumference of bracket 104 whereby a labyrinth seal 27 is formed to provide a mist seal.

In general, the labyrinth seal thus comprises a small clearance and an expansion room, this small clearance preferably ranging from 0.05 to 0.1 mm. Namely, a room 28, where the rotor core 11 coiled by wires and the rotor magnet 6 are disposed, is the expansion room, and the annular space between the hub 3 and the bracket 104 is the small clearance. Air flow energy is consumed in the expansion room 28, and the air flow rate through the small clearance decreases substantially, which prohibits the mist of lubricating fluid from splashing into the clean space 29.

(Exemplary Embodiment 5)

Figure 10:
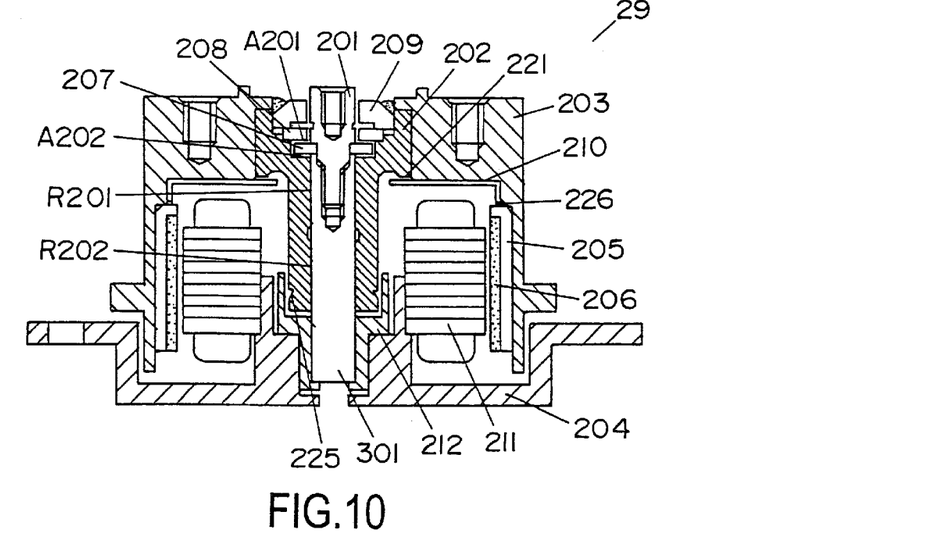
FIG. 10 is a cross section of a motor used in a fifth exemplary embodiment of the present invention.
Figure 11:
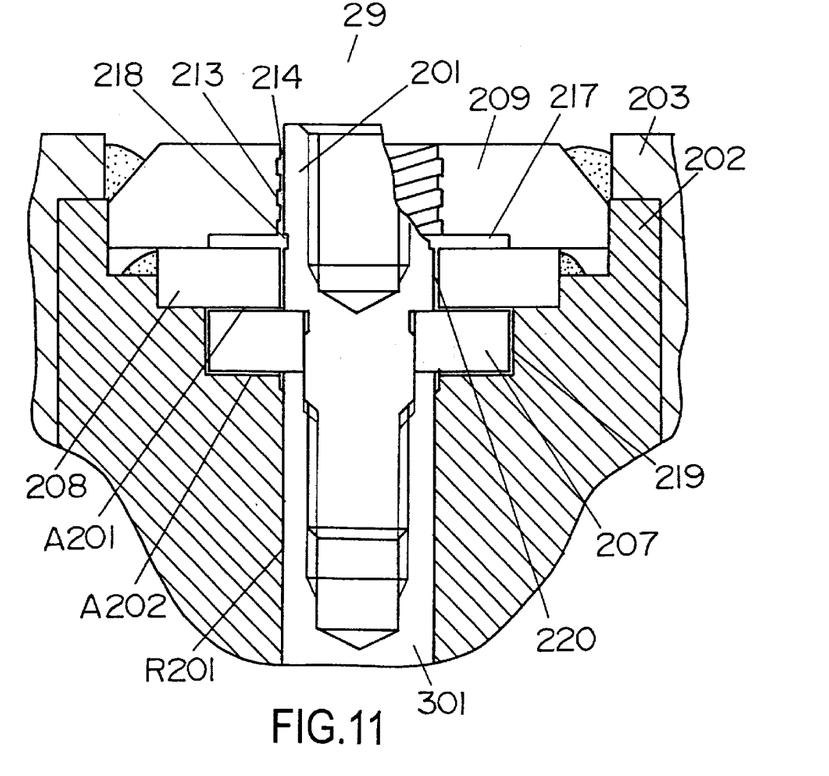
FIG. 11 is an enlarged view of an upper portion of the motor used in the fifth exemplary embodiment of the present invention.

FIG. 10 is a cross section of a motor used in the fifth exemplary embodiment of the present invention. FIG. 11 is an enlarged view of an upper portion of the motor.

In FIGS. 10 and 11, a mount collar 212 is mounted to the inner center of a bracket 204. A shaft 301 is vertically fixed at the center of the mount collar 212. On the bracket 204, protrusion sections and screw holes are provided to mount the spindle device to the disc driving apparatus. On the outer circumference of bracket 204, a stator core 211 of coiled wires is mounted to face a rotor magnet 206 via a narrow clearance.

Magnetic discs (not shown) are to be mounted on the outer circumference of a hub 203. The cylindrical rotor magnet 206 is mounted to the inner circumference of hub 203 via a cylindrical rotor frame 205. On the inner circumference of hub 203, a magnetic shield panel 210 is mounted for preventing leakage of magnetic flux. A sleeve 202 is mounted to another inner circumference of hub 203. Grooves (not shown, but similar to grooves 17 in FIG. 4) are provided inside the sleeve 202 for generating dynamic pressure in lubricating fluid through rotation. The sleeve 202 is rotatively supported by the fixed shaft 301 via the lubricating fluid, and thereby forms radial-dynamic-pressure-fluid bearings R201 and R202.

On the upper end of the fixed shaft 301, a thrust ring 207 is mounted to a top screw 201 to be fixed so that the ring 207 can be kept coaxial with the shaft 301. The fixed thrust ring 207 employs grooves on both sides for generating dynamic pressure in the lubricating fluid. A thrust bearing A202 is formed and rotatively supported between the sleeve 202 and a lower face of the fixed thrust ring 207 via the lubricating fluid. A rotation thrust ring 208 is mounted to the sleeve 202 above the thrust ring 207. A thrust-dynamic-pressure-fluid bearing A201 is formed and rotatively supported between the upper face of thrust ring 207 and the lower face of thrust ring 208 via the lubricating fluid.

The outer circumference of top screw 201 faces the inner circumference of a member 209 for forming a viscous seal 213 via a small annular space 214. The viscous seal 213 is provided above the rotation thrust ring 208. A screw or helical groove is provided inside the member 209, and thereby forms the viscous seal 213. The screw or helical groove rotates to draw air in from the clean space 29 so that the viscous seal 213 can prevent the mist of the lubricating fluid from flowing into the clean space.

A small annular space 219 is formed between the sleeve 202 and the fixed thrust ring 207, and is filled with the lubricating fluid, which is held by surface tension. Further a small annular space 220 is formed between the outer circumference of top screw 201 and the inner circumference of rotation thrust ring 208. The small space 220 is filled with the lubricating fluid, which is held by surface tension.

This surface tension prevents the lubricating fluid from flowing out, and further prevents the mist thereof from splashing above the rotation thrust ring 208. The outer circumference of top screw 201 can be that of fixed shaft 301.

An oil pool 217 is disposed between the thrust ring 208 and the member 209 so that surplus fluid on the inner circumference of the ring 208 travels on the surface of the ring 208 to the oil pool 217 due to centrifugal force. A groove 218 facing the oil pool 217 is provided on the top screw 201. If centrifugal force pushes the surplus fluid on the inner circumference of the ring 208 to flow out, the groove 218 can prevent the flow from traveling to the clean space 29. When the motor is kept upside down, the surplus fluid travels along the top screw 201 and reaches the head thereof. If the motor is driven in this attitude, the fluid will splash into the clean space; however, the groove 218 can block the surplus fluid from travelling down to the head.

A tapered centrifugal force seal 225 is disposed on the lower outer circumference of sleeve 202. For better effect, the seal 225 is disposed on the outer circumference of the rotating body, i.e., sleeve 202, to prevent the lubricating fluid from flowing out. An oil pool 221 is disposed between the sleeve 202 and the magnetic shield plate 210, and another oil pool 226 is disposed between the rotor frame 205 and the magnetic shield panel 210. Surplus fluid in the lower part of sleeve 202 flows out to the outer circumference of sleeve 202; however, the flow is blocked by the centrifugal force seal 225. If the surplus fluid still travels on the outer circumference of sleeve 202 to flow out, the oil pool 221 can block the flow-out from the lower part of sleeve 202. And yet, if the surplus fluid travels on the magnetic shield panel 210 due to centrifugal force accompanied by rotation, the oil pool 226 can block the flow from flowing out to the clean space 29. A narrow clearance can be provided to the oil pools 221 and 226 so that the lubricating fluid can be held by surface tension even if the motor is repeatedly started and stopped.

The oil pools 221 and 226 are, in addition to other seals, preventive measures against draining the fluid into the clean space 29, and these oil pools further prevent the lubricating fluid from flowing out.

(Exemplary Embodiment 6)

Figure 12:
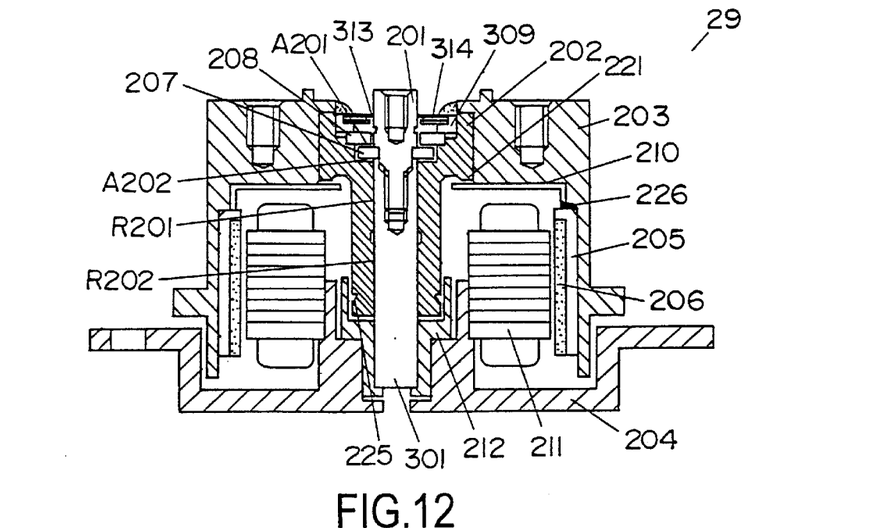
FIG. 12 is a cross section of a motor used in a sixth exemplary embodiment of the present invention.
Figure 13:
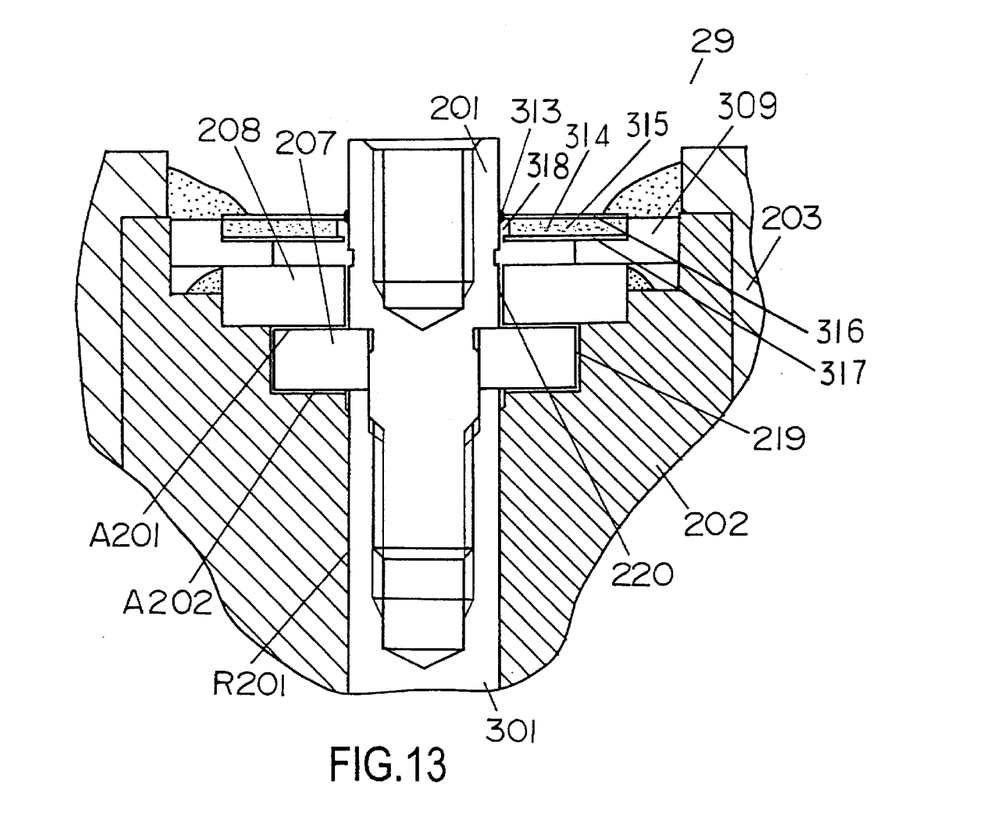
FIG. 13 is an enlarged view of an upper portion of the motor used in the sixth exemplary embodiment of the present invention.

FIG. 12 is a cross section of a motor used in the sixth exemplary embodiment of the present invention. FIG. 13 is an enlarged view of an upper portion of the motor. In FIGS. 12 and 13, this embodiment differs from the fifth exemplary embodiment in the following points: Above the rotation thrust ring 208, a magnetic fluid seal holder 309 is fixed to the sleeve 202. A magnetic fluid seal 314 is fixed to the holder 309, and the seal 314 holds magnetic fluid 313 with magnetic force.

The magnetic fluid seal 314 comprises the following elements:

(a) a ring-shape magnet 315 having N and S poles on respective ends;

(b) ring-shape magnetic members 316 and 317 sandwiching the ring-shape magnet 315; and (c) magnetic fluid 313.

The magnetic fluid seal 314 is formed by being encircled with these elements.

The magnetic fluid 313, as shown in FIG. 13, completely clogs a small clearance between the outer circumference of the top screw 201 and an end face of the magnetic member 316 opposite to the outer circumference. In this case, the following magnetic path is formed. Magnetic flux produced by the magnet 315 travels through the magnetic member 316, magnetic fluid 313 and top screw 201, and arrives at the magnet 315 again via a small clearance between the outer circumference of the top screw 201 and an end face of the magnetic member 317 opposite to the outer circumference. This magnetic path can hold the magnetic fluid 313, whereby the mist of the lubricating fluid is prevented from splashing out from the inner rim of ring 208 into the clean space 29.

Because a room 318 formed by the seal 314 is substantially airtight, the magnetic fluid 313 could possibly be blown out due to a temperature change or a pressure difference. This possible blow-out can be avoided by the following measures: (a) decreasing the capacity of the airtight room 318, and (b) providing a small annular clearance 220 between the ring 208 and the top screw 201 to obtain surface tension which can hold the lubricating fluid. The height of the lubricating fluid surface thus changes, which balances pressures, whereby the blow-out is avoided. The capacity of the airtight room 318 is preferably less than a capacity enclosed by the inner circumference of the rotation thrust ring and the outer circumference of the top screw. The top screw can be incorporated into the fixed shaft.

(Exemplary Embodiment 7)

Figure 14:
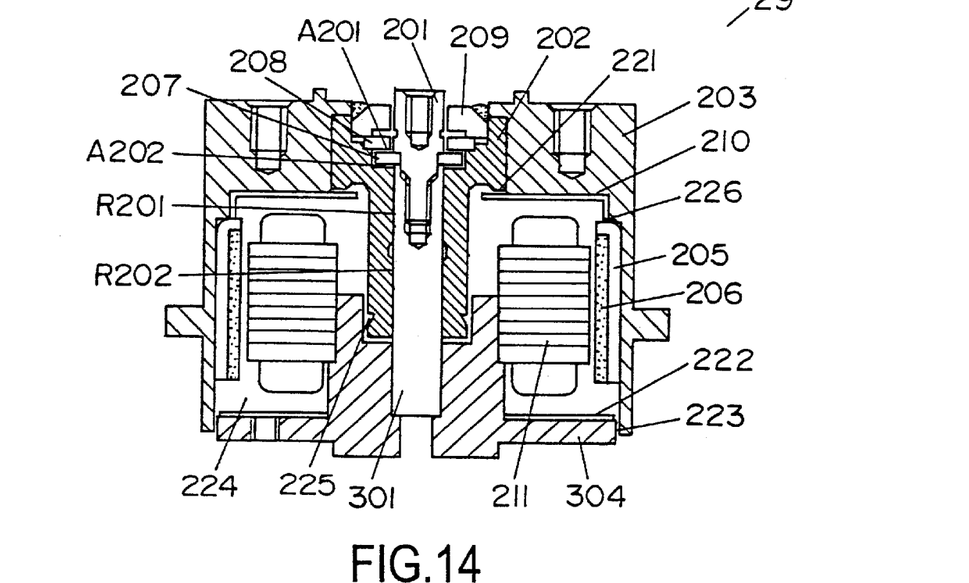
FIG. 14 is a cross section of a motor used in a seventh exemplary embodiment of the present invention.

FIG. 14 is a cross section of a motor used in the seventh exemplary embodiment of the present invention. In FIG. 14, on a bracket 304, an airtight seal 222 is disposed to seal the screw holes and the like provided in the bracket 304. A small annular space is provided between the inner circumference of hub 203 and the outer circumference of bracket 304 whereby a labyrinth seal 223 is formed to provide a mist seal. In the same manner as the fourth exemplary embodiment shows, an expansion room 224, where a stator core 211 and a rotor magnet 206 are disposed, consumes air flow, and the air flow rate through the labyrinth seal decreases substantially, which prevents the mist of lubricating fluid from splashing into the clean space 29.

(Exemplary Embodiment 8)

Figure 15:
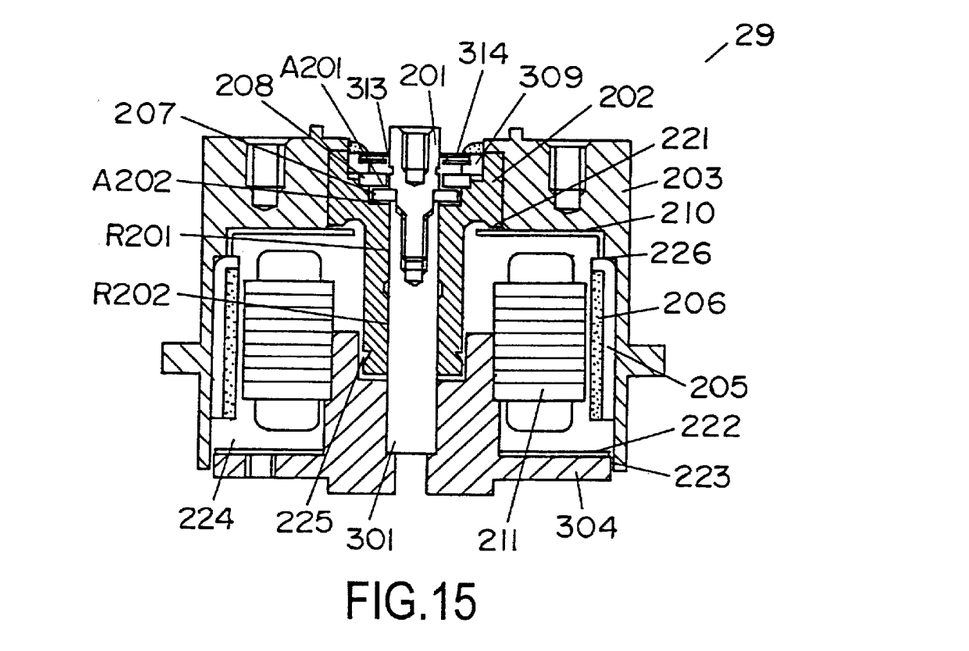
FIG. 15 is a cross section of a motor used in an eighth exemplary embodiment of the present invention.

FIG. 15 is a cross section of a motor used in the eighth exemplary embodiment of the present invention. In FIG. 15, this embodiment differs from the seventh exemplary embodiment in the following point: A magnetic fluid seal 314 is provided, which reinforces the preventive measures against the splash-out of the mist fluid from above the motor.

According to the present invention, combinations of mist seals, oil seals and oil pools can prevent the lubricating fluid from flowing out into the clean space, whereby a reliable spindle device can be realized. The mist seal prevents a mist of the lubricating fluid from splashing out, the oil seal prohibits the lubricating fluid per se from flowing out, and the oil pool is a measure to prevent surplus lubricating fluid from flowing out.

The spindle device of the present invention can be used not only in the magnetic disc driving apparatus, but also other disc driving apparatuses for optical discs, CD-ROMs, MDs, DVDs and others. Further, the spindle device also can be used in other apparatuses, and therefore, the spindle device has a great advantage in industrial applications.

Although illustrated and described herein with reference to certain specific embodiments, the present invention is not limited to the details shown. Rather, various modifications may be made in the details within the scope and range of equivalents of the claims and without departing from the spirit of the invention.

What is claimed is:

1. A spindle device comprising:

a bracket;

a shaft fixed to said bracket;

a stator core mounted to said bracket and having a coiled wire;

a sleeve rotatively supported by said shaft via lubricating fluid so as to form a radial-dynamic-pressure-fluid bearing, said sleeve having first and second end faces;

a hub fixed to said sleeve and adapted to receive discs thereon in a disc space;

a rotor magnet mounted to said hub and situated opposite to said stator core;

a magnetic shield panel disposed on an inner circumference of said hub and facing said stator core; and an oil pool disposed between said sleeve and said magnetic shield panel.

2. The spindle device according to claim 1, and further comprising a rotor frame disposed on an inner circumference of said hub and facing said stator core.

3. The spindle device according to claim 2, wherein said rotor frame supports said rotor magnet.

4. A spindle device comprising:

a shaft having a first end and a second end;

a stator;

a rotor rotatably supported by said shaft via lubricating fluid so as to form a radial-dynamic-pressure-fluid bearing;

a magnet opposed to a coiled wire for causing rotation of said stator relative to said rotor; and a mist-proof seal means to create a mist-proof seal adjacent said first end of said shaft for preventing a mist of lubricating fluid from flowing beyond said first end of said shaft.

5. The spindle device according to claim 4, and further comprising a bracket, wherein said shaft and said stator are fixed to said bracket.

6. The spindle device according to claim 5, wherein said rotor comprises a sleeve rotatably supported by said shaft via the lubricating fluid so as to form the radial-dynamic-pressure-fluid bearing, and a hub fixed to said sleeve, with said hub being adapted to receive discs thereon in a disc space, and wherein said means to create the mist-proof seal is to create the mist-proof seal for preventing mist of the lubricating fluid from flowing beyond said first end of said shaft and into said disc space.

7. The spindle device according to claim 6, wherein said stator includes a core having said coiled wire thereon, and said magnet is secured to said hub.

8. The spindle device according to claim 7, wherein said sleeve has a first end face and a second end face, and further comprising a thrust-dynamic-pressure-fluid bearing including a rotary thrust ring disposed on first end face, and a fixed thrust ring fixed to said shaft, and wherein said means to create the mist-proof seal is disposed between said thrust-dynamic-pressure-fluid bearing and the disc space.

9. The spindle device according to claim 4, wherein said means is to create the mist-proof seal by creating a viscous seal.

10. The spindle device according to claim 9, wherein said means to create the viscous seal by creating sufficient air pressure to prevent the mist of the lubricating fluid from flowing beyond said first end of said shaft.

11. The spindle device according to claim 10, wherein said means to create the sufficient air pressure includes a helical groove in an inner surface of said rotor surrounding said first end of said shaft, such that rotation of said rotor causes said helical groove to rotate whereby air is caused to flow from beyond said first end of said shaft toward the radial-dynamic-pressure-fluid bearing.

12. The spindle device according to claim 11, wherein said rotor includes an annular member attached thereto, and said helical groove is in an inner circumferential surface of said annular member.

13. The spindle device according to claim 12, and further comprising an oil pool disposed between said rotary thrust ring and said helical groove, and wherein said shaft includes a groove adjacent said oil pool.

14. The spindle device according to claim 13, and further comprising a bracket, wherein said shaft and said stator are fixed to said bracket.

15. The spindle device according to claim 14, wherein said rotor comprises a sleeve rotatably supported by said shaft via the lubricating fluid so as to form the radial-dynamic-pressure-fluid bearing, and a hub fixed to said sleeve with said annular member attached to said hub, wherein said hub is adapted to receive discs thereon in a disc space, and wherein during the rotation of said hub said helical groove causes the air to flow from beyond said first end of said shaft such that the mist of the lubricating fluid is prevented from flowing beyond said first end of said shaft into the disc space.

16. The spindle device according to claim 15, wherein said stator includes a core having said coiled wire thereon, and said magnet is secured to an inner circumferential surface of said hub.

17. The spindle device according to claim 16, wherein said sleeve has a first end face and a second end face, and further comprising a thrust-dynamic-pressure-fluid bearing including a rotary thrust ring disposed on said first end face of said sleeve, and a fixed thrust ring fixed to said shaft and opposing said rotary thrust ring, and wherein said helical groove is disposed between said thrust-dynamic-pressure-fluid bearing and said first end of said shaft.

18. The spindle according to claim 17, wherein said shaft includes a screw threaded into said first end of said shaft, wherein said groove adjacent said oil pool is formed in said screw, and wherein said helical groove surrounds said screw.

19. The spindle device according to claim 17, and further comprising a centrifugal force seal disposed on an outer circumferential surface of said sleeve.

20. The spindle device according to claim 17, and further comprising a mount collar fixed to said bracket and coaxially surrounding said second end face of said sleeve.

21. The spindle device according to claim 4, wherein said means to create the mist-proof seal includes a ring-shaped magnet, a pair of ring-shaped magnetic members sandwiching said ring-shaped magnet, and a magnetic fluid.

22. The spindle device according to claim 4, wherein said means to create the mist-proof seal comprises a labyrinth seal including a small clearance between an inner circumference of said rotor and an outer circumference of said rotor.

* * * * *